(12) United States Patent
Persson

(10) Patent No.: US 6,412,829 B1
(45) Date of Patent: Jul. 2, 2002

(54) QUICK-ACTION COUPLING

(75) Inventor: Christer Persson, Skovde (SE)

(73) Assignee: Bo Erik Nyberg, Oberägeri, Schweiz (SE)

( * ) Notice: Subject to any disclaimer, the term of this patent is extended or adjusted under 35 U.S.C. 154(b) by 0 days.

(21) Appl. No.: 09/529,894

(22) PCT Filed: Sep. 30, 1998

(86) PCT No.: PCT/SE98/01768

§ 371 (c)(1),
(2), (4) Date: Jun. 21, 2000

(87) PCT Pub. No.: WO99/20929

PCT Pub. Date: Apr. 29, 1999

(30) Foreign Application Priority Data

Oct. 23, 1997 (SE) ............................... 9703867

(51) Int. Cl.$^7$ ................................ F16L 37/18
(52) U.S. Cl. ................ 285/316; 285/315; 285/86
(58) Field of Search ............... 285/316, 81, 82, 285/86, 315

(56) References Cited

U.S. PATENT DOCUMENTS

| | | | | |
|---|---|---|---|---|
| 1,668,315 A | * | 5/1928 | Hein | |
| 2,076,918 A | * | 4/1937 | Robison | |
| 2,843,401 A | * | 7/1958 | Rogers | |
| 4,313,626 A | * | 2/1982 | Duncan | |
| 4,566,723 A | * | 1/1986 | Schulze et al. | |
| 4,658,326 A | * | 4/1987 | Clark et al. | |
| 5,116,086 A | * | 5/1992 | Psajd | 285/277 |
| 5,255,714 A | | 10/1993 | Mullins | |
| 5,290,009 A | * | 3/1994 | Heilmann | 25/149.6 |
| 6,129,334 A | * | 10/2000 | Kuwabara | 251/149.6 |

FOREIGN PATENT DOCUMENTS

| | | |
|---|---|---|
| DK | B162360 | 11/1991 |
| EP | A1800031 | 10/1997 |

* cited by examiner

*Primary Examiner*—Teri Pham Luu
(74) *Attorney, Agent, or Firm*—Birch, Stewart, Kolasch & Birch, LLP

(57) ABSTRACT

The invention relates to a coupling for hoses for media under pressure. The coupling includes a female part and a nipple. The nipple fits into the female part. A lock ball is provided for locking the nipple in the connected position with the female part. A locking sleeve is spring-loaded toward a locking position in which it holds the ball lock in the engagement position. The locking sleeve can be moved, counter to the spring-loading, to a release position in which the ball lock is released. The movement of the locking sleeve to the release position includes both rotation about the longitudinal axis of the coupling and axial displacement parallel to this axis.

4 Claims, 2 Drawing Sheets

QUICK-ACTION COUPLING

This application is the national phase under 35 U.S.C. §371 of PCT International Application No. PCT/SE98/01768 which has an International filing date of Sep. 30, 1998, which designated the United States of America.

BACKGROUND OF THE INVENTION

1. Field of the Invention

The invention relates to a coupling for hoses or the like for media under pressure.

2. Description of the Background Art

Couplings of this type, so-called quick couplings, are well-known and exist in many different forms. An important area of application for such couplings is to make possible rapid connection and disconnection of a tool operated by pressure medium to/from a hose for supplying pressure medium. During use of the connected tool in a workplace, the hose coupling and the hose are often drawn along when the tool is moved. When this takes place, the hose coupling may get caught on unevennesses in the ground, which may lead to unintentional disconnection. To reduce the risk of this happening, the locking sleeve has been designed in such a manner that it must be both rotated and displaced in the axial direction in order for disconnection to be possible. It has been found, however, that such a construction may also lead to unintentional disconnection. This is because, when the nipple is rotated, for example by the connected tool being rotated during performance of the work, the balls in the ball lock can function like planet wheels in a planetary gear and in this way bring about rotation of the locking sleeve. It is subsequently only necessary for the locking sleeve to be displaced axially for disconnection to take place.

SUMMARY AND OBJECTS OF THE INVENTION

The object of the invention is to produce a coupling of the type referred to in the introduction, which improves the security against unintentional disconnection by eliminating the problem described above.

BRIEF DESCRIPTION OF THE DRAWINGS

The invention is described in greater detail below with reference to the appended drawings, in which.

DETAILED DESCRIPTION OF THE PREFERRED EMBODIMENTS

Figure 1:
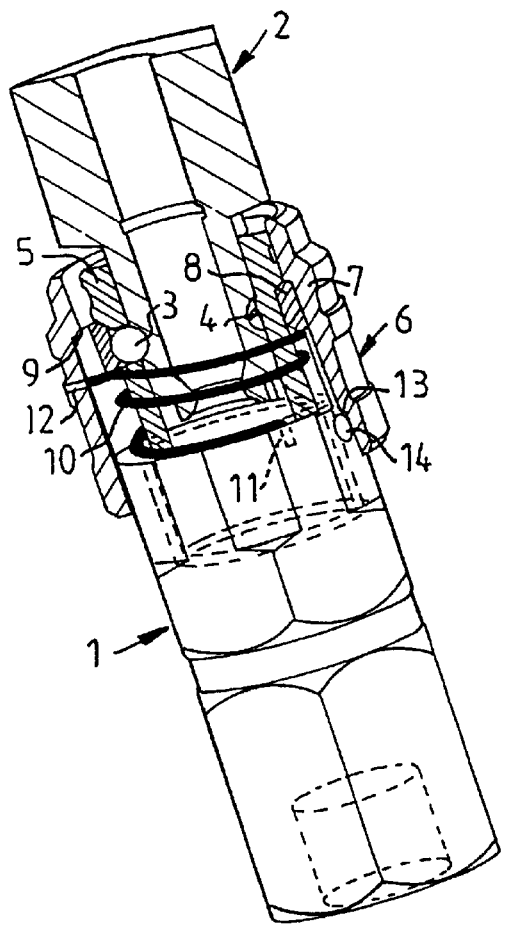
FIG. 1 is a partly cut-away perspective view of a coupling according to an embodiment of the invention in the connected state.

The coupling shown in FIG. 1 comprises a female part 1 and a nipple 2 which fits into the latter. In the completely connected state, as is shown in FIG. 1, the nipple 2 is introduced into the female part 1 into a connected position, in which a number of balls 3 included in a ball lock are introduced into a peripheral groove 4 in the nipple 2 so as to prevent the latter being pulled out of the female part 1. The balls 3 are arranged in holes in an extension 5 which is made in one piece with or is fixed to the female part 1 and are held in the engagement position in the groove 4 by a locking sleeve 6 which surrounds the female part 1 and its extension 5.

What has been described above is well-known within the technical field relating to couplings for hoses, pipes or the like which are intended to distribute liquid or gaseous media under pressure.

According to the invention, the locking sleeve 6 is divided into a main part 7 and an inner ring 8 which is arranged inside the main part 7. The inner ring 8 fits relatively precisely in the main part 7 and, in the completely connected state shown in FIG. 1, bears against a shoulder 9 in the main part 7. There is no connection in the peripheral direction between the inner ring 8 and the main part 7, which means that the ring 8 is free to rotate in the main part 7.

The locking sleeve 6 is held in the completely connected position shown in FIG. 1 by a spring 10 which, in the example shown, consists of a helical spring. The spring 10 bears with its one end against the female part 1 and with its other end against the inner ring 8 in order to hold the latter in bearing contact against the shoulder 9. To make it possible for the spring 10 to also absorb forces in the circumferential direction also, its first end is provided with a bent-over part 11 which is introduced into an appropriate hole in the female part 1 while the other end of the spring 10 is provided with a bent-over part 12 which is introduced into an appropriate hole in the main part 7 of the locking sleeve 6. The spring 10 thus holds the locking sleeve 6 in a position in which the inner ring 8 locks the balls 3 in the groove 4 in the middle, so that it is held in the connected position. Moreover, the spring 10 holds the locking sleeve 6 in a defined rotary position, in which an internal shoulder 13 in the main part 7 of the locking sleeve 6 interacts with a projection 14 on the female part 1 so as to prevent the locking sleeve 6 being displaced axially in the direction away from the nipple 2.

Figure 2:
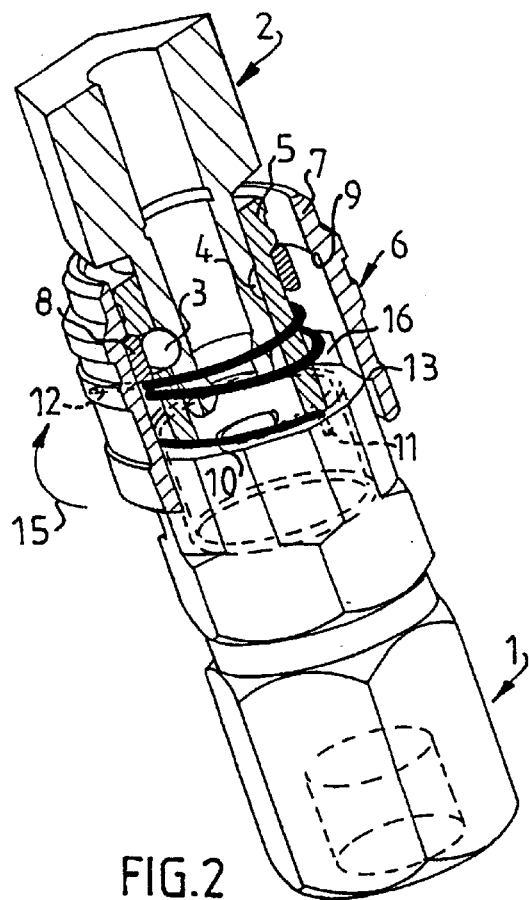
FIG. 2 is a partly cut-away perspective view which shows the coupling according to FIG. 1 after rotation of the locking sleeve to initiate a disconnection procedure.

In order to bring about disconnection of the female part 1 and the nipple 2, the locking sleeve 6 is first rotated in the direction indicated by the arrow 15 in FIG. 2. This takes place counter to the action of the spring 10, and the locking sleeve 6 is rotated to a position in which an axial recess 16 in the shoulder 13 comes to lie in front of the projection 14 so as to make possible axial displacement of the locking sleeve 6 in the backward direction, that is to say in the direction away from the nipple 2. This axial displacement is indicated by the arrow 17 in FIG. 3 which shows the position when the locking sleeve 6 has been displaced axially so far backwards that the inner ring 8 has been moved away from the balls 3. This means that the balls 3 can move radially outwards and away from the peripheral groove 4 in the nipple 2, so that the nipple 2 can be guided out of the female part 1.

Figure 3:
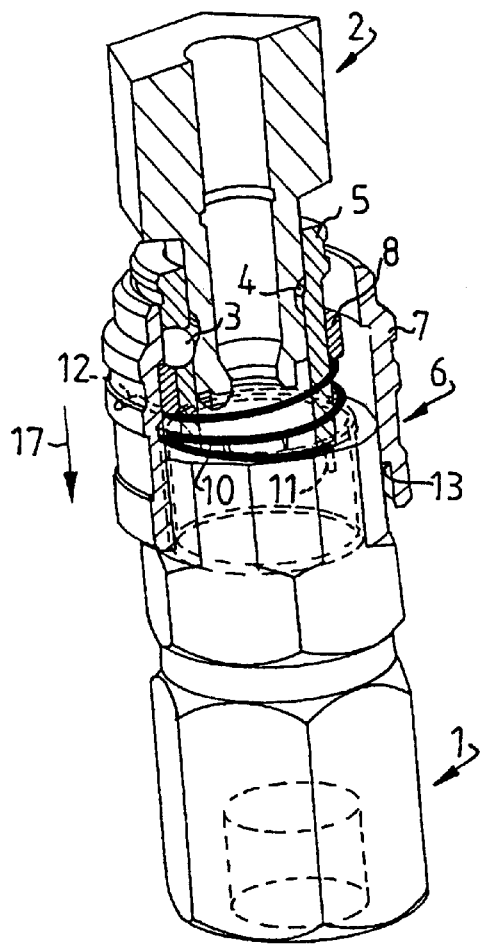
FIG. 3 is a partly cut-away perspective view of the coupling according to FIG. 1 with the locking sleeve moved backwards during a disconnection procedure.
Figure 4:
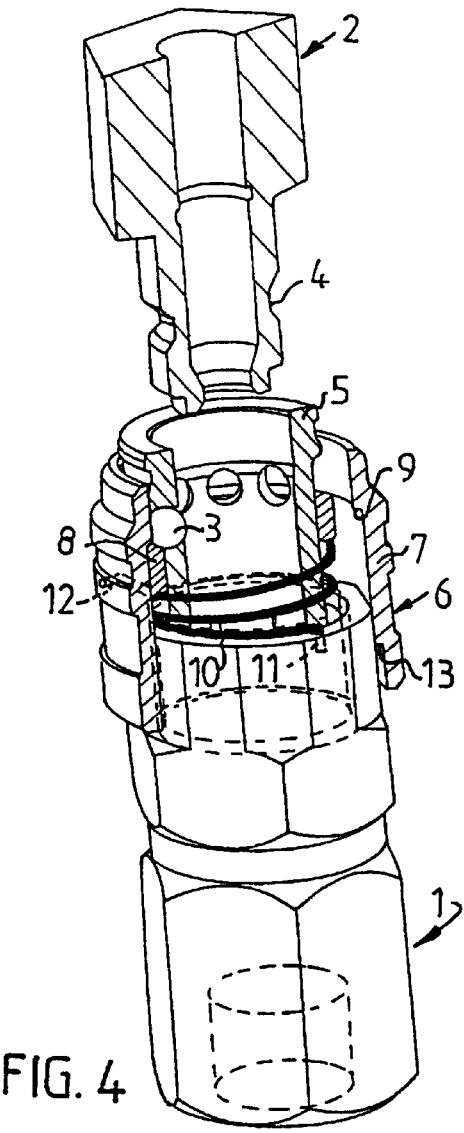
FIG. 4 is a partly cut-away perspective view of the coupling according to FIG. 1 in the completely disconnected state.

Finally, FIG. 4 shows the coupling in a state in which the nipple 2 is completely removed from the female part 1 while the locking sleeve 6 is still held in the same moved-back position as is shown in FIG. 3. The locking sleeve 6 can then be released, whereupon it returns to the position shown in FIG. 1 and the coupling is ready for a new connection procedure, which is effected by the nipple 2 being introduced into the female part 1, the locking sleeve 6 automatically returning to the position shown in FIG. 1.

With the coupling according to the invention described above, the disadvantages of known couplings, which were described in the introduction to the description, are avoided. This therefore means that considerably greater security against unintentional disconnection is afforded, and the reason for this is that the balls 3 cannot transmit any rotary movement from the nipple 2 to the main part 7 of the locking sleeve 6 because the inner ring 8 is not connected to the main part 7 in the direction of rotation.

What is claimed is:

1. Coupling for hoses for media under pressure, comprising:
   a female part and a nipple for the mating with the female part;
   a ball lock for locking the nipple in a connected position in the female part;
   a locking sleeve being spring-loaded towards a locking position for holding the ball lock in an engagement position, said locking sleeve being moved, counter to the spring-loading, to a release position in which the ball lock is released and allows disconnection of the nipple and the female part;
   the movement of the locking sleeve to the release position includes both rotation about the longitudinal axis of the coupling and axial displacement parallel to the axis, wherein the locking sleeve includes a main part and an inner ring rotatably arranged inside said main part and retained there by being axially spring-loaded against a first inside shoulder on the main part by means of a spring acting between the inner ring and female part, the inner ring being arranged to interact with the ball lock including balls being arranged in holes in an extension to the female part and being introducible into a peripheral groove in the nipple and by displacement parallel to the longitudinal axis of the coupling being moved wherein the ball lock is transferred between the engagement position and release position; the main part of the locking sleeve furthermore having on its inside a second shoulder which interacts with a locking member on the female part to prevent axial displacement of the locking sleeve, the second shoulder being designed with an axial recess in order, in a defined rotary position of the locking sleeve, to make possible axial displacement of the latter.

2. Coupling according to claim 1, wherein the first shoulder on the main part of the locking sleeve is provided for acting on the inner ring for displacement of the latter towards the position for release of the ball lock.

3. Coupling according to claim 1, wherein the spring on one hand loads the locking sleeve in the direction towards an axial position in which the inner ring is located in locking position in relation to the ball lock, and on the other hand loads the locking sleeve in the direction of rotation to a position in which the locking member in the shape of a projection is located in front of the second shoulder.

4. Coupling according to claim 1, wherein the spring consists of a helical spring, one end of which is fixed to the female part and the other end of which is fixed to the locking sleeve.

* * * * *